Oct. 10, 1961

R. W. BAKER ET AL 3,003,974

ISOMERIZATION CATALYST

Filed Feb. 5, 1957

INVENTORS
Richard W. Baker
George W. Munns, Jr.
Robert L. Smith
BY
Hastings S. Trigg
ATTORNEY

United States Patent Office 3,003,974
Patented Oct. 10, 1961

3,003,974
ISOMERIZATION CATALYST
Richard W. Baker, Baltimore, Md., and George W. Munns, Jr., West Deptford, and Robert L. Smith, Pitman, N.J., assignors to Socony Mobil Oil Company, Inc., a corporation of New York
Filed Feb. 5, 1957, Ser. No. 638,352
4 Claims. (Cl. 252—451)

This invention relates to the art of catalysis. It is more particularly concerned with an improved catalyst for the hydroisomerization of pentanes.

As is well known to those familiar with the art, it has been proposed to reform hydrocarbon fractions into high octane gasolines in the presence of hydrogen and of various catalysts containing platinum or palladium. In general, however, these processes have been disadvantageous for the production of extremely high octane gasolines because the catalysts have not been sufficiently selective for the isomerization of pentanes. In view of the present day interest in producing high octane gasolines, it becomes of interest to subject the pentane hydrocarbons to separate isomerization in the presence of hydrogen, in order to improve the octane rating thereof.

As is well known to those familiar with the art, it has been proposed to isomerize pentane in the presence of various catalysts including cobalt, nickel, and other metals or metal oxides supported upon carriers such as silica-alumina. These catalysts have not proved generally effective in achieving a high degree of selectivity for the isomerization reaction at conversion levels that are commercially and economically feasible.

It has now been found that isomerization can be carried out with a very high degree of selectivity in the presence of platinum-silica-alumina catalyst. It has been discovered that a platinum on silica-alumina catalyst, wherein the silica alumina carrier contains specified amounts of alumina and is made in a specified manner, is a superior catalyst for the isomerization of pentane.

Accordingly, it is an object of this invention to provide a novel platinum on silica-alumina isomerization catalyst. Another object of this invention is to provide a commercially feasible process for isomerizing pentane in the presence of an improved platinum on silica-alumina catalyst. A further object is to provide a process for isomerizing pentane that is carried out in the presence of hydrogen and of a novel platinum on silica-alumina catalyst. A specific object is to provide a novel platinum on silica-alumina catalyst, wherein the carrier contains specified amounts of alumina and is prepared in a particular manner, as described hereinafter.

Figure 2:
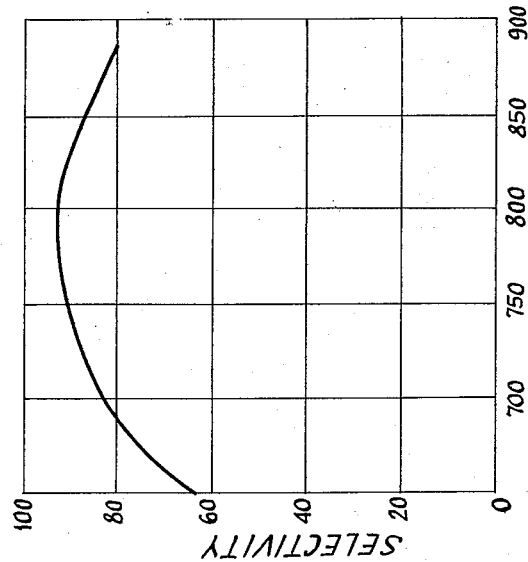
Figure 1:
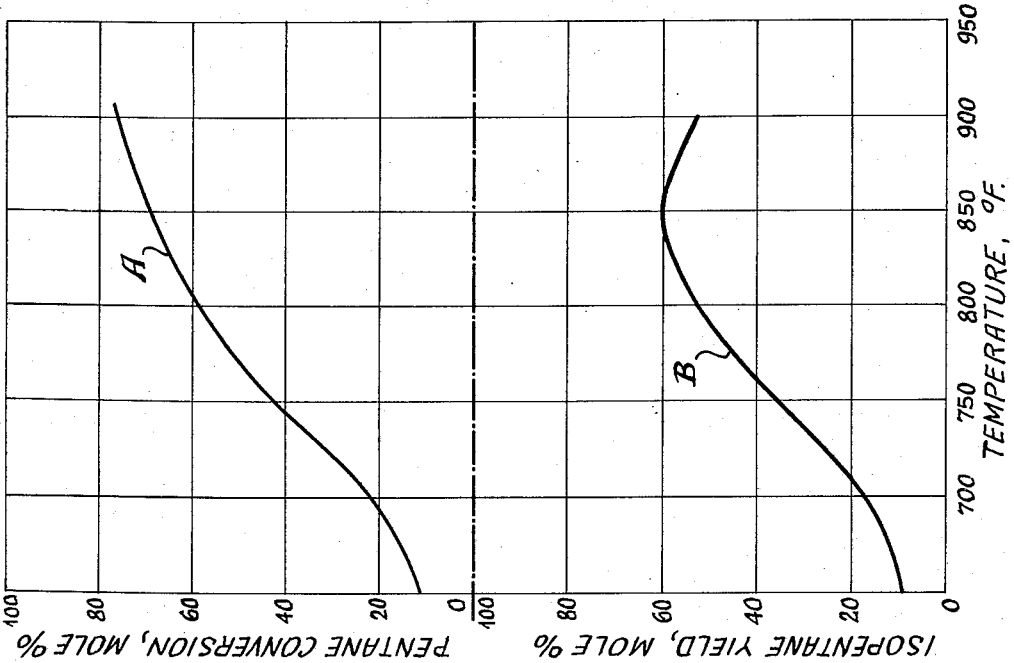

Other objects and advantages of the present invention will be apparent from the following detailed description considered in conjunction with the drawings, wherein:

FIGURE 1 represents the graphic relationship between the mole percent conversion of normal pentane and the temperature and the mole percent yield of isopentane and the temperature, when normal pentane is subjected to isomerization in the presence of hydrogen and of a typical platinum on silica-alumina catalyst of this invention; and FIG. 2 represents the graphic relationship between the temperature and the selectivity when normal pentane is subjected to isomerization in the presence of hydrogen and of a typical platinum on silica-alumina catalyst of this invention.

In general, the present invention provides a catalyst for the isomerization of pentane that comprises between about 0.01 percent and about 5 percent, by weight of the catalyst, of platinum or palladium supported upon a synthetic composite of silica and alumina that contains between about 10 percent and about 40 percent alumina by weight; said synthetic composite of silica and alumina being produced by precipitating alumina upon a slurry of silica hydrogel; and an isomerization process that comprises contacting pentane with the aforedescribed catalyst at a temperature varying between about 700° F. and about 1000° F. at a liquid hourly space velocity varying between about 0.5 and about 20, using a hydrogen to hydrocarbon molar ratio varying between about 0.5 and about 20 and employing a pressure varying between about 50 pounds per square inch gauge and about 1000 pounds per square inch gauge.

As used herein, "conversion of normal pentane" refers to the total mole percent of the pentane charge that is converted into other products, i.e., isopentane, butanes, propane, ethane, and methane. "Selectivity" denotes the amount of pentane conversion that represents conversion into isopentane. This is determined by the calculation $$\frac{\text{mole percent isopentane yield}}{\text{mole percent conversion of pentane}} \times 100$$

The novel catalysts of this invention comprise platinum or palladium deposited upon a synthetic composite of silica and alumina. The silica-alumina carrier for these catalysts will contain between about 10 weight percent and about 40 weight percent alumina. A preferred catalyst of this invention contains between about 23 and about 40 weight percent alumina. The manner in which this synthetic composite of silica and alumina is prepared is critical and involves the precipitation of alumina upon a slurry of silica hydrogel under prescribed conditions. General procedures for preparing a suitable composite of silica and alumina utilizable to produce a catalyst of this invention are set forth in U.S. Letters Patent Nos. 2,469,314 and 2,701,793 to which reference is made.

One general feature of the silica-alumina carrier for the catalyst of this invention is its low apparent density. The conditions for producing gels of low density are well-known to those familiar with the art. In general, a silica hydrogel is first prepared from a silicate by treating it with acid at a pH varying between about 0 and about 7. The silica hydrogel is then aged at a pH varying between about 1 and about 6 for about 0.5 to 24 hours at temperatures varying between about 40 and about 100° F. Sulfuric acid may be added, if necessary, to adjust the pH to about 3–3.5. The silica hydrogel thus prepared is then slurried into an aqueous solution of an aluminum salt such as aluminum chloride or aluminum sulfate and the pH of the slurry is raised to about 4.5–5.5 by the addition of ammonia or other suitable caustic material, in order to precipitate the alumina hydrogel on the silica slurry in the desired amount. The thus-impregnated hydrogel is then filtered and washed in the usual manner, and dried and calcined to the gel state.

It is essential that the synthetic composite of silica and alumina be produced in the aforedescribed manner, in order to provide a highly selective isomerization catalyst of this invention. In this connection, it has been found that platinum on silica-alumina catalyst, wherein the carrier is prepared by other methods, such as by cogelation or by grinding together the hydrogels, are not sufficiently selective for the isomerization reaction.

The amount of platinum or palladium metal that is composited upon the silica-alumina carrier will vary between about 0.01 and about 5 weight percent and preferably between about 0.05 to about 0.5 percent by weight of the catalyst. The platinum or palladium metal can be deposited upon the silica-alumina support using methods well known to those familiar with the art. In general, the carrier will be impregnated with an aqueous solution of a suitable salt, such as platinum chloride, palladium chloride, platinous chloride, chloroplatinic acid, or a solution containing the complex platinum ammine; followed by drying and by reduction in the presence of hydrogen to the metal. Other methods involve the impregnation of the carrier with a platinum compound and a treatment with hydrogen sulfide gas prior to drying and reduction. It is to be understood that the particular method by which the platinum is affixed to the carrier is not critical herein provided that the carrier is produced as has been described hereinbefore. The following examples are illustrative of the catalysts of the present invention and of the method by which they are produced.

EXAMPLE 1

A 2680 ml. portion of waterglass solution containing 520 grams $SiO_2$ was mixed with 9500 ml. of distilled water in a reaction vessel. The resultant waterglass solution was agitated and the pH thereof was reduced to 6.1 by slowly adding 970 ml. of 25 percent aqueous sulfuric acid. The reaction vessel was then cooled, in order to maintain the temperature at about 70° F. The resulting slurry of hydrous silica was then allowed to stand for 2 hours at 70° F. At the end of that period of time the pH of the slurry was then reduced to 3.5 by stirring in an additional 50 ml. of 25 percent aqueous sulfuric acid. To this slurry of silica hydrogel with agitation was added a solution of 1142 grams aluminum sulfate, octadecyl hydrate in 1300 ml. of distilled water. The pH of the resulting mixture was 3.7. The pH of this mixture was then raised to 4.65 by stirring in 680 ml. of 28 percent aqueous ammonia solution, thereby precipitating alumina hydrogel on the silica hydrogel. The resultant slurry of silica-alumina hydrogel was filtered by suction and the filter cake was washed with dilute aqueous sulfuric acid (pH=3.1) until it was free of sodium. This filter cake was then slurried with water and the pH was raised to 6.4 with an aqueous ammonia solution and then the slurry was filtered. The filter cake from the second filtration was water washed until the washed water showed a negative test for sulfate ion.

The washed cake of silica-alumina hydrogel was then dried at 280° F. for 24 hours and calcined for 16 hours at 1000° F. The calcined silica-alumina thus obtained was crushed and screened.

A 250 gram portion of the crushed silica-alumina composite that passed a 14 mesh screen (U.S. Standard Sieve Series) and was retained upon a 25 mesh screen, was impregnated in vacuo with 92 ml. of a solution that contained 1 gram platinum in the form of chloroplatinic acid. This volume of solution was just sufficient to fill the pores of the silica-alumina granules. The thus-impregnated carrier was heated in a covered vessel for 16 hours at a temperature of 230° F. Then the material was heated to a temperature of 450° F. under a stream of nitrogen gas. When the temperature had reached 450° F., hydrogen gas was substituted for the nitrogen and heating was continued in the presence of hydrogen for two hours at 450° F. At the end of this period of time, the temperature was raised to 950° F. and maintained there for two hours, still in the presence of hydrogen. The catalyst was then cooled to room temperature under a stream of nitrogen gas. The surface area of the finished catalyst was 322 square meters per gram and the platinum contained was 0.43 weight percent. For purposes of further identification this catalyst is designated as catalyst A.

EXAMPLE 2

Catalyst B was prepared from a commercially available composite of silica and alumina prepared in a manner similar to that of the preceding example. This catalyst carrier, however, contained 13 percent alumina. It was impregnated in vacuo with chloroplatinic acid in an amount sufficient to produce a final concentration of platinum metal of 0.4 weight percent using the procedure described in Example 1. This catalyst had a final surface area of 401 square meters per gram.

EXAMPLE 3

Catalyst C was produced from a commercially available silica-alumina composite having an alumina content of 15.3 percent produced in a manner similar to that described in Example 1. This catalyst contained 0.4 weight percent platinum metal which was impregnated thereon using the procedure described in Example 1, and it had a final surface area of 313 square meters per gram.

EXAMPLE 4

Catalysts D, E, and F contained, respectively, 0.43 percent, 0.11 percent and 0.057 percent platinum by weight of the catalyst impregnated upon a commercially available silica-alumina composite having an alumina content of 26.9 percent by weight prepared by a method similar to that described in Example 1. The platinum metal was impregnated thereon using the techniques described in Example 1.

EXAMPLE 5

Catalyst G was produced from a commercially available silica-alumina composite having an alumina content of 32.5 weight percent that was produced in a manner similar to that described in Example 1. This catalyst contained 0.52 weight percent platinum, impregnated thereon using the procedure described in Example 1.

For purposes of comparison several other platinum on silica-alumina catalysts were prepared utilizing various methods other than those described in the preceding examples. These catalysts were prepared as follows:

EXAMPLE 6

Silica hydrogel and alumina hydrogel were admixed by ball milling in proportions to produce a silica-alumina hydrogel composite containing 25 percent alumina and 75 percent silica. This composite was then dried and calcined. The calcined composite was then impregnated with platinum to a finished platinum content of 0.36 weight percent using the impregnation procedure described in Example 1. This catalyst is designated at catalyst H.

EXAMPLE 7

A catalyst containing 0.4 weight percent platinum deposited upon a carrier comprising 50 percent silica and 50 percent alumina was prepared using the procedures described in Example 6. This catalyst is designated catalyst J.

EXAMPLE 8

A silica-alumina cogelled bead cracking catalyst containing 10 percent alumina by weight was ground to a mesh size of 10 to 24 mesh. The carrier thus prepared was then impregnated with 0.5 weight percent platinum using the procedure set forth in Example 1. This catalyst is designated at catalyst K.

The pertinent properties of the catalysts described in the preceding Examples 1 through 8 are set forth in Table I.

*Table I*

| Catalyst | Pt, Wt. percent | SiO₂ Wt. percent | Al₂O₃, Wt. percent | Surface Area, m.²/g. |
|---|---|---|---|---|
| A | 0.43 | 75 | 25 | 322 |
| B | 0.40 | 87.7 | 12.3 | 401 |
| C | 0.4 | 84.7 | 15.3 | 344 |
| D | 0.43 | 73.1 | 26.9 | 259 |
| E | 0.11 | 73.1 | 26.9 | 242 |
| F | 0.057 | 73.1 | 26.9 | 235 |
| G | 0.52 | 67.5 | 32.5 | 262 |
| H | 0.36 | 75 | 25 | 403 |
| J | 0.4 | 50 | 50 | |
| K | 0.5 | 90 | 10 | 425 |

The hydocarbon charge stocks that can be isomerized in the presence of the catalysts of this invention include pentane and mixtures containing substantial proportions of pentanes. The isomerization reaction, using the catalysts of this invention, is carried out in the presence of hydrogen in amounts, expressed in terms of mole ratio of hydrogen to hydrocarbon charge, varying between about 0.5 and about 20 and preferably between about 1 and about 6. The hydrogen pressure will vary between about 50 and 1000 pounds per square inch gauge and preferably between about 100 and about 600 pounds per square inch gauge. The liquid hourly space velocity will vary between about 0.5 and about 20 and preferably between about 1 and about 5.

In order to achieve a high degree of selectivity for the isomerization reaction using the catalyst of this invention, the temperature must be correlated with the liquid hourly space velocity. In general, the isomerization reaction is most practicable with the present catalyst at a conversion level at which between about 50 percent and about 60 percent of the hydrocarbon charge is converted. Accordingly, the reaction temperature must be controlled to between about 700° F. and 1000° F. and preferably between about 725° F. and about 875° F. Within these temperature ranges as the liquid hourly space velocity is increased the temperature required will also be increased, to maintain a high level of conversion.

EXAMPLE 9

Pure normal pentane (99.5 percent normal pentane) was contacted with catalyst D in the presence of hydrogen under a pressure of 500 pounds per square inch gauge. The molar ratio of hydrogen to hydrocarbon charge was 10 and the liquid hourly space velocity was 2. The charge material was contacted with the catalyst at several temperatures varying between 650° F. and 850° F. At each temperature there was determined the total mole percent conversion of the normal pentane charge and the mole percent yield of isopentane. The pertinent data are set forth in Table II.

*Table II*

| Average Catalyst Temp., ° F. | Pentane Conversion, Mole Percent | Isopentane Yield, Mole Percent | Selectivity, $\frac{\text{Isopentane}}{\text{Pentane Conv.}} \times 100$ |
|---|---|---|---|
| 650 | 13.7 | 8.7 | 63.6 |
| 673 | 16.6 | 12.4 | 74.7 |
| 718 | 26.8 | 23.3 | 87.0 |
| 751 | 43.5 | 38.3 | 88.2 |
| 803 | 57.7 | 52.8 | 91.5 |
| 810 | 60.9 | 54.7 | 89.9 |
| 848 | 67.2 | 58.8 | 87.6 |

The curves in FIG. 1 are based upon the data set forth in Table II. Curve A defines the relationship between the mole percent total conversion of the normal pentane charge and the temperature. Curve B defines the relationship between the mole percent yield of isopentane and the temperature. From curves A and B can be determined the amount of isopentane yield at any conversion level and the temperature required to effect that amount of conversion. For example, from curve A it will be noted that a conversion of 60 mole percent is attained at a temperature of about 809° F. The isomer yield (curve B) at this temperature and conversion level is about 55 mole percent. Thus, this catalyst, at 809° F., has a selectivity (calculated as hereinbefore described) of about 92%.

The curve in FIG. 2 is also based upon the data set forth in Table II. This table defines the relationship between the temperature and the selectivity for the isomerization reaction. It will be noted from the curve in FIG. 2 that a high degree of isomerization selectivity is obtained when the isomerization reaction is carried out at between about 725° F. and about 875° F. As it has been mentioned hereinbefore, the temperature of the reaction will vary directly with liquid hourly space velocity. In general, therefore, the isomerization process using the catalyst of this invention can be carried at temperatures varying between about 700° F. and 1000° F.

Using the method of operating that was used to obtain the curves in FIGS. 1 and 2 there were determined for a number of catalysts the temperature, the selectivity and the mole percent isopentane yield obtained by isomerizing the normal pentane at conversion levels of 50 percent and of 60 percent. These runs are described in the following examples:

EXAMPLE 10

In a series of runs, normal pentane was subjected to isomerization in the presence of catalysts A, B, C, E, F and G. Each run was carried out using a hydrogen to hydrocarbon molar ratio of 10, a liquid hourly space velocity of 2, and a hydrogen pressure of 500 pounds per square inch gauge. For each catalyst there were determined the temperature, the selectivity, and the mole percent yield of isopentane at the conversion levels of 50 prcent and of 60 percent. The pertinent data are set forth in Table III.

*Table III*

| Catalyst | 50% Conversion | | | 60% Conversion | | |
|---|---|---|---|---|---|---|
| | Temp., ° F. | Isopentane, Mole Percent | Selectivity | Temp., ° F. | Isopentane, Mole Percent | Selectivity |
| A | 765 | 46 | 92 | 885 | 53 | 88 |
| B | 770 | 45 | 90 | 790 | 53 | 88 |
| C | 817 | 45 | 90 | 837 | 50 | 83 |
| D | 778 | 46 | 92 | 818 | 55 | 92 |
| E | 778 | 46 | 92 | 818 | 56 | 93 |
| F | 778 | 46 | 92 | 818 | 56 | 93 |
| G | 790 | 48 | 96 | 820 | 56 | 90 |

It will be apparent from the data set forth in Table III that all the catalysts of this invention have a high degree of selectivity for the isomerization of normal pentane. It will be noted that the selectivity for isomerization as well as the activity does not appear to be affected by the concentration of platinum in the catalysts. This will be apparent by comparison of the results for catalysts D, E and F. It will be apparent, therefore, that in addition to the efficiency of the isomerization reaction, the catalysts of the present invention are also economically advantageous because the amount of platinum required is relatively small. This, of course, effects a substantial saving in catalyst cost, from the commercial standpoint.

Catalysts prepared by methods other than that used to prepare the catalysts of this invention do not have the high degree of activity and selectivity. This will be apparent from the following example:

EXAMPLE 11

Normal pentane, in a series of runs, was subjected to isomerization in the presence of catalysts H, J, and K. Each run was carried out under the same conditions of hydrogen to hydrocarbon ratio, liquid hourly space velocity and pressure as the runs described in Example 10. For each catalyst there were determined the temperature, the selectivity and the mole percent yield of isopentane at the conversion levels of 50 percent and of 60 percent. The pertinent data are set forth in Table IV.

*Table IV*

| Catalyst | 50% Conversion | | | 60% Conversion | | |
|---|---|---|---|---|---|---|
| | Temp., ° F. | Isopentane, Mole Percent | Selectivity | Temp., ° F. | Isopentane, Mole Percent | Selectivity |
| H | 865 | 42 | 83 | 888 | 46 | 76 |
| J | 865 | 42 | 83 | 888 | 46 | 76 |
| K | 715 | 5 | 10 | 715 | 6 | 10 |

From a comparison of the data in Table III with those of Table IV, it will be at once apparent that the catalysts of the present invention have greater selectivity as well as activity than catalysts prepared by conventional methods. It will be apparent to those skilled in the art, therefore, that the present invention provides an isomerization catalyst superior, in all respects, to previously known platinum-silica-alumina isomerization catalysts. The advantageous results achieved by the use of the catalysts of this invention make apparent their obvious applicability to a commercial process.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A catalyst for the isomerization of pentane which comprises between about 0.01 percent and about 5 percent, by weight of the catalyst, of a metal selected from the group consisting of platinum and palladium supported upon a synthetic composite of silica and alumina that contains between about 10 percent and about 40 percent alumina by weight; said synthetic composite of silica and alumina being produced by first producing silica hydrogel by treating water glass with strong inorganic acid at a pH between 0 and 7, aging said silica hydrosol at a pH between one and 6, for 0.5 to 24 hours, at temperatures varying between about 40° F. and about 100° F.; slurrying the aged silica hydrogel in an aqueous solution of an aluminum salt and adjusting the pH to between about 4.5 and about 5.5, thereby precipitating alumina on the silica hydrogel; and drying and calcining the composite, thus produced, to the gel state.

2. A catalyst for the isomerization of pentane which comprises between about 0.05 percent and about 0.5 percent, by weight of the catalyst, of a metal selected from the group consisting of platinum and palladium supported upon a synthetic composite of silica and alumina that contains between about 23 percent and about 40 percent alumina by weight; said synethetic composite of silica and alumina being produced by first producing silica hydrogel by treating water glass with strong inorganic acid at a pH between 0 and 7, aging said silica hydrosol at a pH between one and 6, for 0.5 to 24 hours, at temperatures varying between about 40° F. and about 100° F.; slurrying the aged silica hydrogel in an aqueous solution of an aluminum salt and adjusting the pH to between about 4.5 and about 5.5, thereby precipitating alumina on the silica hydrogel; and drying and calcining the composite, thus produced, to the gel state.

3. A catalyst for the isomerization of pentane which comprises between about 0.05 and about 0.5 percent, by weight of the catalyst, of platinum supported upon a synthetic composite of silica and alumina that contains about 27 percent alumina by weight; said synthetic composite of silica and alumina being produced by first producing silica hydrogel by treating water glass with strong inorganic acid at a pH between 0 and 7, aging said silica hydrosol at a pH between one and 6, for 0.5 to 24 hours, at temperatures varying between about 40° F. and about 100° F.; slurrying the aged silica hydrogel in an aqueous solution of an aluminum salt and adjusting the pH to between about 4.5 and about 5.5, thereby precipitating alumina on the silica hydrogel; and drying and calcining the composite, thus produced, to the gel state.

4. A catalyst for the isomerization of pentane which comprises between about 0.05 and about 0.5 percent, by weight of the catalyst, of platinum supported upon a synthetic composite of silica and alumina that contains about 33 percent by weight; said synthetic composite of silica and alumina being produced by first producing silica hydrogel by treating water glass with strong inorganic acid at a pH between 0 and 7, aging said silica hydrosol at a pH between one and 6, for 0.5 to 24 hours, at temperatures varying between about 40° F. and about 100° F.; slurrying the aged silica hydrogel in an aqueous solution of an aluminum salt and adjusting the pH to between about 4.5 and about 5.5, thereby precipitating alumina on the silica hydrogel; and drying and calcining the composite, thus produced, to the gel state.

References Cited in the file of this patent

UNITED STATES PATENTS

| | | |
|---|---|---|
| 2,469,314 | Ryland et al. | May 3, 1949 |
| 2,623,860 | Haensel | Dec. 30, 1952 |
| 2,651,598 | Ciapetta | Sept. 8, 1953 |
| 2,662,861 | Riblett et al. | Dec. 15, 1953 |
| 2,701,793 | Ashley | Feb. 8, 1955 |
| 2,794,002 | Haensel et al. | May 28, 1957 |

UNITED STATES PATENT OFFICE

CERTIFICATION OF CORRECTION

Patent No. 3,003,974                      October 10, 1961

Richard W. Baker et al.

It is hereby certified that error appears in the above numbered patent requiring correction and that the said Letters Patent should read as corrected below.

Column 8, line 25, after "percent" insert -- alumina --.

Signed and sealed this 3rd day of April 1962.

(SEAL)
Attest:

ERNEST W. SWIDER                      DAVID L. LADD

Attesting Officer                       Commissioner of Patents